United States Patent [19]
Wakayama et al.
[11] Patent Number: 4,608,186
[45] Date of Patent: Aug. 26, 1986

[54] MAGNETIC FLUID

[75] Inventors: Katsuhiko Wakayama; Hiraku Harada, both of Tokyo, Japan

[73] Assignee: TDK Corporation, Tokyo, Japan

[21] Appl. No.: 760,469

[22] Filed: Jul. 30, 1985

[30] Foreign Application Priority Data

Jul. 30, 1984 [JP] Japan ............................... 59-159930
Sep. 18, 1984 [JP] Japan ............................... 59-194985

[51] Int. Cl.[4] .............................................. C09K 5/00
[52] U.S. Cl. .............................. 252/62.52; 252/62.51; 252/62.55
[58] Field of Search ............... 252/62.52, 62.53, 62.54, 252/62.51, 62.55

[56] References Cited

U.S. PATENT DOCUMENTS

| | | | |
|---|---|---|---|
| 3,764,540 | 10/1973 | Khalafalla et al. | 252/62.52 |
| 3,917,538 | 11/1975 | Rosensweig | 252/62.52 |
| 4,315,827 | 2/1982 | Bottenberg | 252/62.52 |
| 4,356,098 | 10/1982 | Chagnon | 252/62.53 |
| 4,430,239 | 2/1984 | Wyman | 252/62.52 |

OTHER PUBLICATIONS

Mehta et al., J. Mag. & Mag Mat., 39 (1983) pp. 35-38.
Winkler, Chem. Abst., 86 (1977) #132462.
Ito et al., Chem. Abst., 87 (1977) #145014.

*Primary Examiner*—Arthur P. Demers
*Attorney, Agent, or Firm*—Oblon, Fisher, Spivak, McClelland & Maier

[57] ABSTRACT

A magnetic fluid comprising metal fine particles of cobalt, 25 to 60% based on the weight of the metal particles of a surface-active agent selected from the group consisting of polyglycerine fatty acid esters, sorbitan fatty acid esters, and mixtures thereof, and 50 to 250% based on the weight of the metal particles of a low boiling hydrocarbon medium exhibits remarkably high saturation magnetization.

15 Claims, 3 Drawing Figures

MAGNETIC FLUID

BACKGROUND OF THE INVENTION

This invention relates to magnetic fluid.

Among magnetic fluids are known dispersions of fine particles of magnetic oxide material, typically magnetite ($Fe_3O_4$) pretreated with a surface-active agent in oil or water. Such magnetic fluids have been utilized in a variety of applications.

Known magnetic fluids of such magnetic materials as magnetite can only provide a saturation magnetization of the order of 200 to 300 G and in special cases, 550 to 600 G at the maximum. The relatively low saturation magnetization is a bar against more useful application of magnetic fluids. There is the need for development of magnetic fluid having high saturation magnetization.

The saturation magnetization of magnetic fluid may be enhanced by two processes, that is, by increasing the saturation magnetization of dispersed fine particles themselves and by increasing the content of fine particles in the medium. The latter process of increasing the concentration of fine particles, however, cannot produce a magnetic fluid having a saturation magnetization in excess of 600 G with magnetite because the magnetic fluid undesirably becomes paste with the increasing concentration.

The former magnetic fluids using fine particles having high saturation magnetization are described in J. Thomas, U.S. Pat. No. 3,228,881 and O. Harle, U.S. Pat. No. 3,228,882, for example. Cobalt carbonyl $Co_2(CO)_8$ or iron carbonyl $Fe(CO)_5$ is thermally decomposed in a polymer such as acrylonitrile-styrene copolymer and then dispersed in a hydrocarbon medium. Since fine particles having high saturation megnetization are employed in these methods, the resulting magnetic fluids are expected to have higher saturation magnetization than the magnetite magnetic fluids. It is, however, difficult to increase the concentration of fine particles because the resulting fluid becomes paste. For this reason, actually prepared magnetic fluids possess only a saturation magnetization of the order of 300 to 400 G, which value is not of significance as compared with the magnetite magnetic fluids.

Other known methods includes the preparation of ferromagnetic fine particles of Fe, Ni, Co or the like by an electroless plating process followed by dispersion in a suitable medium, and the preparation of fine particles of Fe, Co or the like by the explosion of such material in an inert gas followed by dispersion in a suitable medium. None of these methods have succeeded in producing magnetic fluid having desirably high saturation magnetization.

Metal fine particles in these magnetic fluids are expected to be readily oxidized with a probable reduction in saturation magnetization.

SUMMARY OF THE INVENTION

It is, therefore, an object of the present invention to provide a novel and improved magnetic fluid having outstandingly higher saturation magnetization than prior art magnetic fluids.

Another object of the present invention is to provide such a magnetic fluid characterized by controlled oxidation as well as increased saturation magnetization.

The present invention is directed to a magnetic fluid comprising metal fine particles of cobalt, a surface-active agent, and a hydrocarbon medium. According to the present invention, the surface-active agent is at least one member selected from the group consisting of polyglycerine fatty acid esters, sorbitan fatty acid esters, and mixtures thereof.

In one preferred embodiment of the present invention, the magnetic fluid further contains an antioxidant for preventing oxidation of metal fine particles.

BRIEF DESCRIPTION OF THE DRAWINGS

The above and other objects, features, and advantages of the present invention will become more apparent by reading the following description taken in conjunction with the accompanying drawings, in which.

DETAILED DESCRIPTION OF THE INVENTION

Figure 1:
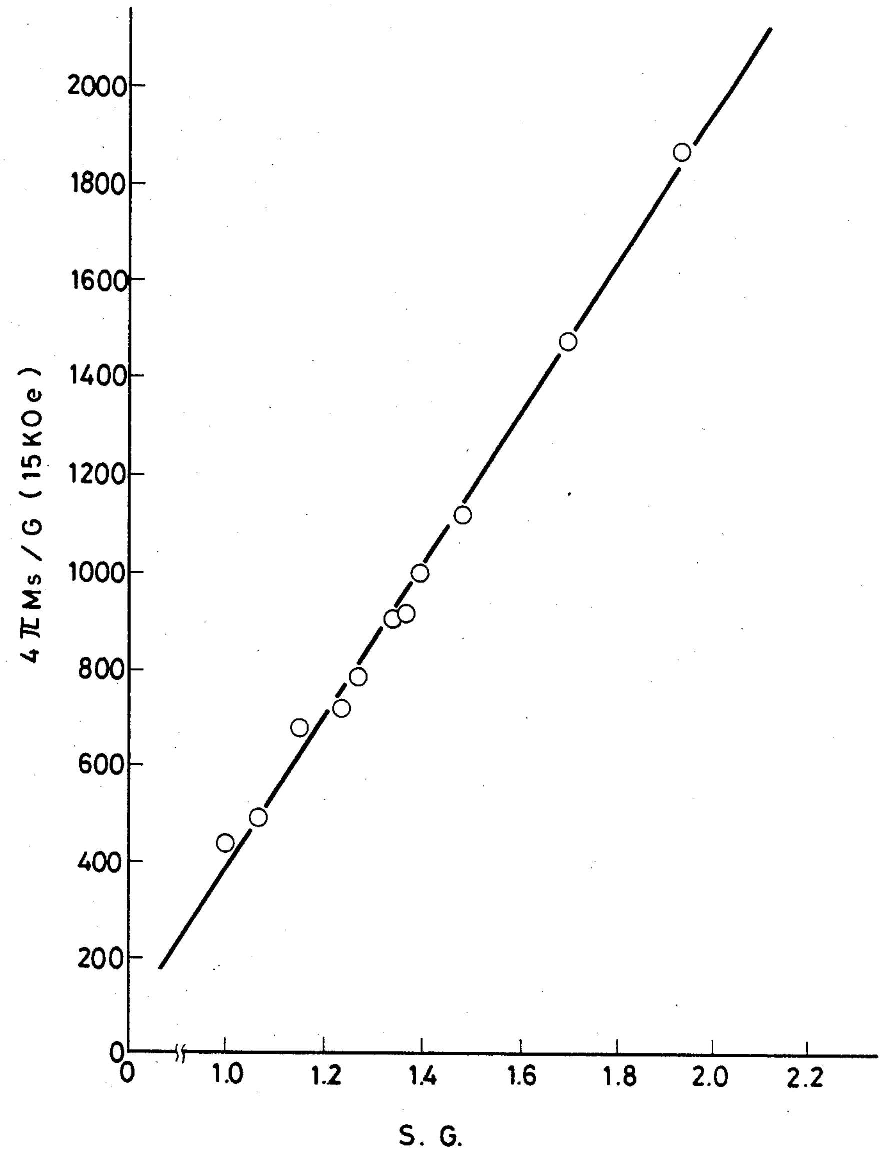
FIGS. 1 and 2 are diagrams showing the saturation magnetization ($4\pi Ms/G$) of cobalt fine particle-containing magnetic fluids as a function of the specific gravity thereof, FIG. 1 corresponding to a magnetic fluid comprising kerosine as the hydrocarbon medium and decaglyceryl heptaoleate as the surface-active agent and FIG. 2 corresponding to a magnetic fluid comprising kerosine as the hydrocarbon medium and 1,5-sorbitan monooleate as the surface-active agent.

The present invention is directed to a magnetic fluid comprising metal fine particles of cobalt dispersed in a hydrocarbon medium. Since ferromagnetic fine particles must be dispersed in liquid, cobalt metal must be first finely divided into discrete particles of a sufficient particle size to overcome their magnetic cohesive force. The cobalt metal fine particles used in the practice of the present invention have an average particle size of 70 to 120 Å.

It is necessary to prevent flocculation of fine particles due to van der Waals force. In the prior art, magnetic oxide particles are chemically coated with a polar surface-active agent to prevent flocculation by the repulsion of particles to each other. However, no such coating agent has been discovered for metal base magnetic fluids.

We have discovered that a nonionic surface-active agent in the form of a fatty acid ester can effectively assist in the stable dispersion of metal fine particles in a hydrocarbon medium. More particularly, the surface-active agent used in the present invention is at least one member selected from the group consisting of polyglycerine fatty acid esters, sorbitan fatty acid esters, and mixtures thereof.

The polyglycerine fatty acid esters have the general formula [1]:

$$\underset{OR}{CH_2}-\underset{OR}{CH}CH_2-O\left[CH_2\underset{OR}{CH}-CH_2-O\right]_n CH_2-\underset{OR}{CH}-\underset{OR}{CH_2} \qquad [1]$$

where R is individually hydrogen or an acyl group derived from a saturated or unsaturated fatty acid, and n is a positive integer inclusive of zero. When R stands for acyl, plural R radicals may be different, but generally the same. For the polyglycerine fatty acid esters, the polyglycerine may preferably have a degree of polymerization of 2 to 10, that is, n=0 to 8. More preferably, n is an integer between 4 and 8.

The polyglycerine fatty acid esters may preferably be partial esters of fatty acids. A percent esterification of 25 to 85% is preferable.

The sorbitan fatty acid esters include fatty acid mono-, sesqui- (mixtures of mono and di), and di-esters of 1,5-sorbitan, 1,4-sorbitan, and other isomers. Among these preferred are fatty acid mono- and sesqui-esters of 1,5-sorbitan and 1,4-sorbitan having the general formulas [2] and [3]:

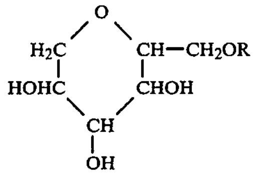

[2]

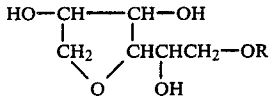

[3]

where R is an acyl group derived from a saturated or unsaturated fatty acid. The preferred fatty acid esters are esters of fatty acids having 10 to 18 carbon atoms, and especially 18 carbon atoms, namely, stearic acid, isostearic acid, and oleic acid.

The esters mentioned above are commercially available while they may be readily prepared by conventional esterification process.

The addition of these surface-active agents prevents to a considerable extent magnetic fluids from becoming paste when metal fine particles are dispersed in high concentrations to increase saturation magnetization.

Illustrative examples of the surface-active agents used in the practice of the present invention include (i) polyglycerine fatty acid esters such as
(1) decaglyceryl pentaoleate,
(2) decaglyceryl pentastearate,
(3) decaglyceryl pentaisostearate,
(4) decaglyceryl heptastearate,
(5) decaglyceryl heptaisostearate,
(6) decaglyceryl heptaoleate,
(7) decaglyceryl isostearate,
(8) decaglyceryl decastearate,
(9) decaglyceryl decaoleate,
(10) diglyceryl monooleate,
(11) diglyceryl dioleate,
(12) tetraglyceryl tristearate,
(13) tetraglyceryl tetrastearate,
(14) tetraglyceryl pentaoleate,
(15) hexaglyceryl tristearate,
(16) hexaglyceryl pentaoleate, and
(17) hexaglyceryl pentastearate; and (ii) sorbitan unsaturated fatty acid esters such as
(1) 1,5-sorbitan monooleate,
(2) 1,4-sorbitan monooleate,
(3) 1,4-sorbitan monostearate,
(4) 1,4-sorbitan monoisostearate,
(5) 1,4-sorbitan sesquioleate, and
(6) 1,4-sorbitan sesquiisostearate.

Mixtures of two or more of the foregoing esters may also be used as the surface-active agent according to the present invention.

The ester surface-active agent is added to the fluid in amounts of about 25 to 60% by weight based on the weight of the metal fine particles. Amounts of less than 25% by weight are ineffective in promoting dispersion. The metal fine particles will agglomerate and precipitate upon cooling after reaction to be explained hereinafter when the surface-active agent is present in excess of 60% by weight.

The hydrocarbons used as the dispersion medium in the practice of the present invention may preferably have 7 to 22 carbon atoms, more preferably 7 to 14 carbon stoms, most preferably 7 to 10 carbon atoms and include paraffinic and olefinic hydrocarbons such as kerosine, aromatic hydrocarbons such as toluene, xylene, etc. Particularly, xylene and kerosine are preferred for the saturated fatty acid esters while kerosine is preferred for the unsaturated fatty acid esters. The hydrocarbon medium is present in amounts of 50 to 250% by weight based on the weight of the metal fine particles.

The magnetic fluids of the present invention may further contain an effective amount of an antioxidant for preventing oxidation of cobalt particles. The antioxidants used herein may be conventional oil-soluble antioxidants.

Tocopherols are preferred among others. The most preferred tocopherol is D,L-α-tocopherol having the general formula [4]:

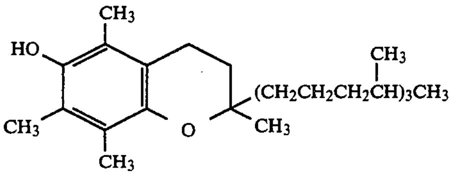

[4]

In addition, β-tocopherol, γ-tocopherol, δ-tocopherol, and d-α-tocopherol may also be used.

The antioxidants may be used in amounts of 0.5 to 3% by weight of the weight of the metal fine particles. Less than 0.5% of the antioxidant is ineffective whereas more than 3% of the antioxidant will adversely affect magnetic properties.

The magnetic fluids of the present invention may be prepared by dissolving the surface-active agent and optionally, the antioxidant in the hydrocarbon medium, adding a metal carbonyl to the hydrocarbon medium, and heating the mixture to thereby thermally decompose the metal carbonyl. The metal carbonyl used herein may be cobalt carbonyl as expressed by $Co_2(CO)_8$ although not limited thereto. Thermal decomposition may be effected at a temperature of 120° to 180° C. for about 2 to 4 hours. The temperature and time may be suitably chosen in accordance with the concentration of cobalt and the type of hydrocarbon medium.

The thus prepared magnetic fluid must be stored in a suitable sealed container. The interior of the container is preferably purged with an inert gas such as argon and nitrogen.

The magnetic fluid of the present invention has the advantages of improved dispersion and saturation magnetization over prior art magnetic fluids because metal fine particles of cobalt possessing increased saturation megnetization are dispersed in a hydrocarbon medium with the aid of a nonionic surface-active agent consisting of at least one polyglycerine or sorbitan fatty acid ester. A magnetic fluid having a desired saturation magnetization may be readily prepared simply by controlling the concentration of metal fine particles. The relationship between the concentration of metal fine particles and the saturation magnetization of a fluid is maintained substantially linear over a wide concentration range. These benefits are achievable only with a specific combination of metal fine particles, surface-active agent, and hydrocarbon medium as defined in the present invention.

The addition of the antioxidant retards oxidation of metal fine particles which is otherwise accompanied by saturation magnetization reduction.

EXAMPLES

In order that those skilled in the art will better understand how to practice the present invention, examples are given below by way of illustration and not by way of limitation.

EXAMPLE 1

Into a three-necked flask fitted with a reflux condenser, thermometer, and stirrer was admitted 12 grams of decaglyceryl heptaoleate in 30 grams of kerosin medium. To this solution was added 120 grams of octacarbonyl dicobalt $Co_2(CO)_8$.

With stirring, the mixed solution was gradually heated up to about 150° C. with the aid of a mantle heater. Heating under reflux caused the cobalt carbonyl to thermally decompose. The decomposition gas CO emitted from the top of the condenser. The emission of CO gas was confirmed by passing the gas into a $PdCl_2$ solution in 1/1 acetone/water. Introduction of CO gas turned the palladium chloride solution from orange to black. After CO emission subsided, stirring was continued for an additional 30 minutes. Upon cooling, there was obtained a black solution.

The black solution was centrifuged at 6,000 rpm for one hour. There was observed little separation or settlement. The fine particles in the solution were measured to have an average particle size of 77 Å.

Magnetic fluids of varying concentrations can be prepared by controlling the amount of kerosine medium. It will be understood that the concentration of a fluid is equivalently expressed by the specific gravity of the fluid.

A number of magnetic fluids were prepared in the same manner as above and measured for specific gravity and saturation magnetization ($4\pi Ms/G$). The results are shown in Table 1 and FIG. 1. The diagram of FIG. 1 shows the saturation magnetization as a function of the specific gravity of magnetic fluids.

TABLE 1

| Co—Polyglyceryl System (decaglyceryl heptaoleate) | | |
|---|---|---|
| Sample No. | Specific gravity | $4\pi Ms/G$ (15 kOe) |
| 1 | 1.0073 | 358 |
| 2 | 1.1424 | 687 |
| 3 | 1.3699 | 926 |
| 4 | 1.4809 | 1127 |
| 5 | 1.6920 | 1474 |
| 6 | 1.9309 | 1870 |
| 7 | 2.0667 | 2040 |

As evident from the data in Table I, substantially increased saturation magnetization is achievable with the present invention.

"The New Electronic Materials Research Report X-Magnetic Material Research Report 1", the Japan Electronic Industry Promoting Associate, pages 90–94 (March 1984) reports that the polymeric coating as proposed in U.S. Pat. No. 3,228,881 produces a magnetic fluid having a saturation magnetization of the order of 300 to 400 G. As compared with the prior art fluid, the magnetic fluid of the present invention is extraordinarily improved in saturation magnetization.

The linearity between saturation magnetization and specific gravity as depicted in FIG. 1 is very advantageous in actual applications.

EXAMPLE 2

The procedure of Example 1 was repeated except that the decaglyceryl heptaoleate was replaced by 1,5-sorbitan monooleate. The resulting black solution was centrifuged at 6,000 rpm for one hour to find little separation or settlement.

Figure 2:
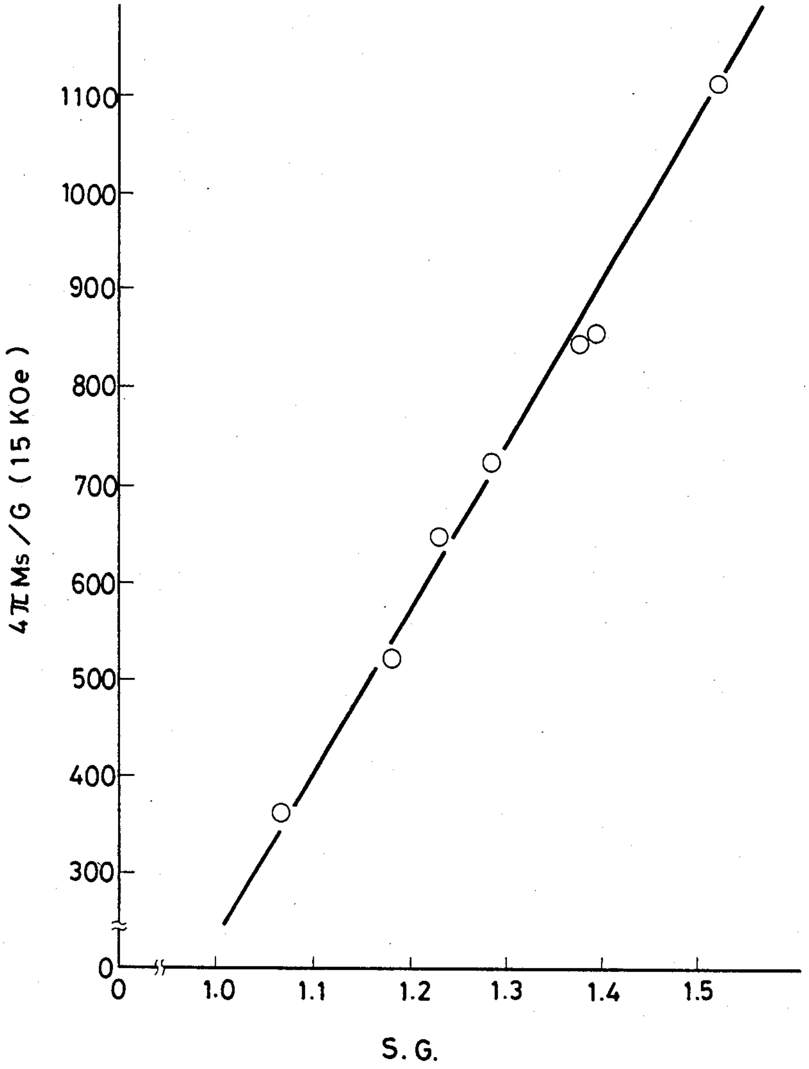

The specific gravity and saturation magnetization of the thus obtained fluids are shown in Table 2 and FIG. 2.

TABLE 2

| Co—Sorbitan System (1,5-sorbitan monooleate) | | |
|---|---|---|
| Sample No. | Specific gravity | $4\pi Ms/G$ (15 kOe) |
| 21 | 1.0667 | 366 |
| 22 | 1.1706 | 526 |
| 23 | 1.2341 | 651 |
| 24 | 1.2886 | 732 |
| 25 | 1.3896 | 860 |
| 26 | 1.5154 | 1108 |

EXAMPLE 3

The procedure of Example 1 was repeated except that the kerosine was replaced by toluene, and that 30 grams of $Co_2(CO)_8$, 30 grams of decaglyceryl heptaoleate, and 20 grams of toluene were used. The resulting black solution was centrifuged at 6,000 rpm for one hour to find little separation or settlement.

The fluid had a specific gravity of 1.1589 and a saturation magnetization of 490 G.

EXAMPLE 4

The procedure of Example 3 was repeated except that the toluene was replaced by xylene. The resulting black solution was centrifuged at 6,000 rpm for one hour to find little separation or settlement.

The fluid had a specific gravity of 1.3250 and a saturation magnetization of 880 G.

EXAMPLE 5

The procedure of Example 1 was repeated except that the decaglyceryl heptaoleate was replaced by decaglyceryl decaoleate, and that 30 grams of $Co_2(CO)_8$, 3 grams of decaglyceryl decaoleate, and 20 grams of kerosine were used. The resulting black solution was centrifuged at 6,000 rpm for one hour to find little separation or settlement.

The fluid had a specific gravity of 1.1234 and a saturation magnetization of 720 G.

EXAMPLE 6

The procedure of Example 5 was repeated except that the decaglyceryl decaoleate was replaced by 1,4-sorbitan monooleate. The resulting black solution was centrifuged at 6,000 rpm for one hour to find little separation or settlement.

The fluid had a specific gravity of 1.2003 and a saturation magnetization of 615 G.

EXAMPLE 7

The procedure of Example 5 was repeated except that the decaglyceryl decaoleate was replaced by a mixture of two surface-active agents, decaglyceryl heptaoleate and decaglyceryl decaoleate. The resulting black solution was centrifuged at 6,000 rpm for one hour to find little separation or settlement.

The fluid had a specific gravity of 1.1854 and a saturation magnetization of 620 G.

EXAMPLE 8

The procedure of Example 4 was repeated except that the decaglyceryl heptaoleate was replaced by hexaglyceryl sesquistearate surface-active agent. The resulting black solution was centrifuged at 6,000 rpm for one hour to find little separation or settlement.

The fluid had a specific gravity of 1.2009 and a saturation magnetization of 620 G.

EXAMPLE 9

The procedure of Example 8 was repeated except that the hexaglyceryl sesquistearate was replaced by tetraglyceryl tristearate surface-active agent. The resulting black solution was centrifuged at 6,000 rpm for one hour to find little separation or settlement.

The fluid had a specific gravity of 1.2911 and a saturation magnetization of 688 G.

EXAMPLE 10

The procedure of Example 9 was repeated except that the tetraglyceryl tristearate was replaced by tetraglyceryl pentastearate surface-active agent. The resulting black solution was centrifuged at 6,000 rpm for one hour to find little separation or settlement.

The fluid had a specific gravity of 1.1273 and a saturation magnetization of 620 G.

EXAMPLE 11

The procedure of Example 5 was repeated except that the decaglyceryl decaoleate was replaced by diglyceryl monooleate. The resulting black solution was centrifuged at 6,000 rpm for one hour to find little separation or settlement.

The fluid had a specific gravity of 1.2478 and a saturation magnetization of 789 G.

EXAMPLE 12

The procedure of Example 11 was repeated except that the diglyceryl monooleate was replaced by diglyceryl dioleate. The resulting black solution was centrifuged at 6,000 rpm for one hour to find little separation or settlement.

The fluid had a specific gravity of 1.1583 and a saturation magnetization of 1140 G.

EXAMPLE 13

The procedure of Example 11 was repeated except that the diglyceryl monooleate was replaced by decaglyceryl pentaisostearate surface-active agent. The resulting black solution was centrifuged at 6,000 rpm for one hour to find little separation or settlement.

The fluid had a specific gravity of 1.1639 and a saturation magnetization of 560 G.

EXAMPLE 14

The procedure of Example 11 was repeated except that the diglyceryl monooleate was replaced by 1,4-sorbitan monoisostearate surface-active agent. The resulting black solution was centrifuged at 6,000 rpm for one hour to find little separation or settlement.

The fluid had a specific gravity of 1.2876 and a saturation magnetization of 980 G.

EXAMPLE 15

The procedure of Example 11 was repeated except that the diglyceryl monooleate was replaced by 1,4-sorbitan sesquioleate surface-active agent. The resulting black solution was centrifuged at 6,000 rpm for one hour to find little separation or settlement.

The fluid had a specific gravity of 1.2248 and a saturation magnetization of 1150 G.

EXAMPLE 16

The procedure of Example 4 was repeated except that the decaglyceryl heptaoleate was replaced by 1,4-sorbitan monostearate surface-active agent. The resulting black solution was centrifuged at 6,000 rpm for one hour to find little separation or settlement.

The fluid had a specific gravity of 1.2000 and a saturation magnetization of 757 G.

EXAMPLE 17

The procedure of Example 5 was repeated except that the decaglyceryl decaoleate was replaced by decaglyceryl isostearate. The resulting black solution was centrifuged at 6,000 rpm for one hour to find little separation or settlement.

The fluid had a specific gravity of 1.0773 and a saturation magnetization of 870 G.

EXAMPLE 18

Into a three-necked flask fitted with a reflux condenser, thermometer, and stirrer was admitted 12 grams of decaglyceryl heptaoleate and 2 grams of D,L-α-tocopherol antioxidant in 30 grams of kerosine medium. To this solution was added 120 grams of octacarbonyl dicobalt $Co_2(CO)_8$.

With stirring, the mixed solution was gradually heated up to about 150° C. with the aid of a mantle heater. Heating under reflux caused the cobalt carbonyl to thermally decompose. The decomposition gas CO emitted from the top of the condenser. The emission of CO gas was confirmed by passing the gas into a $PdCl_2$ solution in 1/1 acetone/water. Introduction of CO gas turned the palladium chloride solution from orange to black. After CO emission subsided, stirring was continued for an additional 30 minutes. Upon cooling, there was obtained a black solution.

The black solution was centrifuged at 6,000 rpm for one hour. There was observed little separation or settlement.

In this way, several magnetic fluids containing the D,L-α-tocopherol antioxidant in concentrations given in Table 3 were prepared. They were aged upon exposure to atmosphere to examine how their saturation magnetization varied with the lapse of time. The aging variation is expressed by the ratio of the saturation magnetization Ms(ex) at a point of measurement to the initial saturation magnetization Ms(in) of freshly prepared magnetic fluid (t=0). The results are shown in Table 3 and FIG. 3.

TABLE 3

| Day | Variation of saturation magnetization with time as expressed in Ms(ex)/Ms(in) — Concentration of D,L-α-tocopherol added, wt % 0 | 0.86 | 1.2 | 2.3 |
|---|---|---|---|---|
| 1 | 0.80 | — | 0.95 | — |
| 2 | — | 0.90 | — | 0.96 |
| 4 | — | — | 0.93 | — |
| 8 | — | — | 0.84 | — |
| 10 | — | — | 0.82 | — |
| 13 | 0.78 | — | — | — |
| 16 | 0.76 | — | — | 0.89 |
| 18 | — | — | 0.86 | — |
| 23 | — | — | — | 0.87 |
| 24 | — | 0.73 | — | — |
| 26 | — | — | — | 0.86 |
| 28 | 0.75 | — | 0.85 | — |

Figure 3:
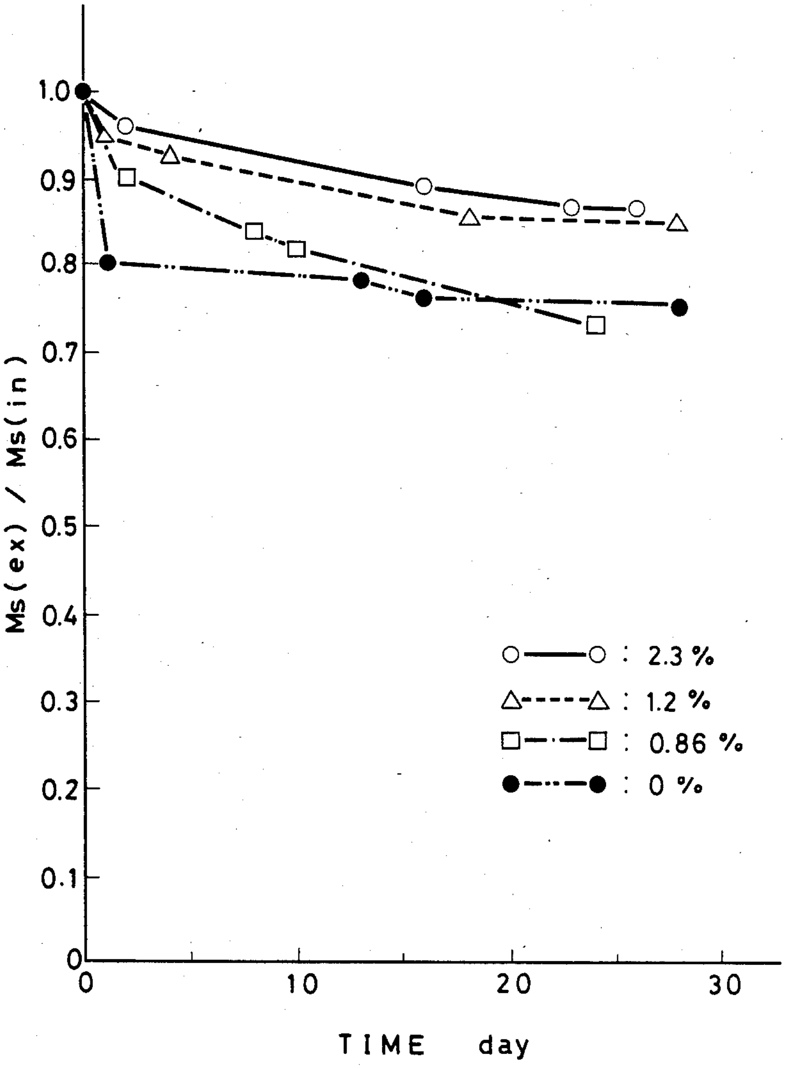
FIG. 3 is a diagram showing the variation with time of the saturation magnetization of various magnetic fluids comprising cobalt particles, decaglyceryl heptaoleate surface active agent, kerosine medium, and D,L-α-tocopherol antioxidant added in concentrations of 0, 0.86, 1.2, and 2.3%.

As seen from Table 3 and FIG. 3, the addition of D,L-α-tocopherol in amounts of 1.2 and 2.3% based on the weight of cobalt particles prevents the reduction of saturation magnetization at the end of about one month by about 10% as compared with the antioxidant-free fluid.

These data apparently show the unexpected effect of te present invention. That is, the present invention has succeeded in developing stable magnetic fluids possessing the long desired saturation magnetization as high as 1000 G or more and reaching about 2200 G at the maximum. Saturation magnetization is in direct proportion to metal particle concentration over a considerably wide concentration range. It is then possible to prepare a magnetic fluid possessing any desired saturation magnetization by properly changing the concentration of metal fine particles.

What is claimed is:

1. A magnetic fluid comprising metal fine particles of cobalt, a surface-active agent, and a hydrocarbon medium, the improvement wherein said surface-active agent is at least one member selected from the group consisting of polyglycerine fatty acid esters, sorbitan fatty acid esters, and mixtures thereof.

2. A magnetic fluid according to claim 1 wherein the metal fine particles have an average particle size of 70 to 120 Å.

3. A magnetic fluid according to claim 1 wherein the polyglycerine has a degree of polymerization of 2 to 10.

4. A magnetic fluid according to claim 1 wherein the polyglycerine fatty acid ester is a partial ester of a polyglycerine with a fatty acid.

5. A magnetic fluid according to claim 1 wherein the sorbitan is 1,4-sorbitan or 1,5-sorbitan.

6. A magnetic fluid according to claim 1 wherein the sorbitan fatty acid ester is a mono or sesqui-ester of sorbitan with a fatty acid.

7. A magnetic fluid according to claim 1 wherein the fatty acid of the ester is one member selected from saturated and unsaturated fatty acids having 10 to 18 carbon atoms.

8. A magnetic fluid according to claim 7 wherein the fatty acid is selected from stearic acid, isostearic acid, and oleic acid.

9. A magnetic fluid according to claim 1 wherein the surface-active agent is present in an amount of 25 to 60% by weight of the weight of the metal fine particles.

10. A magnetic fluid according to claim 1 wherein the hydrocarbon medium has 7 to 22 carbon atoms.

11. A magnetic fluid according to claim 10 wherein the hydrocarbon medium is kerosine or an aromatic hydrocarbon.

12. A magnetic fluid according to claim 1 wherein the hydrocarbon medium is present in an amount of 50 to 250% by weight of the weight of the metal fine particles.

13. A magnetic fluid according to claim 1 which further comprises an effective amount of an antioxidant.

14. A magnetic fluid according to claim 13 wherein the antioxidant is tocopherol.

15. A magnetic fluid according to claim 13 wherein the antioxidant is present in an amount of 0.5 to 3% by weight of the weight of the metal fine particles.

* * * * *